(12) United States Patent
Chae et al.

(10) Patent No.: US 11,654,554 B2
(45) Date of Patent: May 23, 2023

(54) ARTIFICIAL INTELLIGENCE CLEANING ROBOT AND METHOD THEREOF

(71) Applicant: LG ELECTRONICS INC., Seoul (KR)

(72) Inventors: Jonghoon Chae, Seoul (KR); Kyuho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 16/941,460

(22) Filed: Jul. 28, 2020

(65) Prior Publication Data

US 2021/0187732 A1 Jun. 24, 2021

(30) Foreign Application Priority Data

Dec. 20, 2019 (KR) .................. 10-2019-0171584

(51) Int. Cl.
*B25J 11/00* (2006.01)
*G05D 1/02* (2020.01)
*B25J 9/16* (2006.01)

(52) U.S. Cl.
CPC .............. *B25J 9/163* (2013.01); *B25J 9/161* (2013.01); *B25J 9/1653* (2013.01); *B25J 9/1661* (2013.01); *B25J 9/1679* (2013.01); *B25J 11/0085* (2013.01); *G05D 1/0221* (2013.01); *G05D 1/0274* (2013.01); *G05D 2201/0203* (2013.01)

(58) Field of Classification Search
None
See application file for complete search history.

(56) References Cited

U.S. PATENT DOCUMENTS

| 2018/0253671 A1* | 9/2018 | Kuhara | ................. A47L 9/2889 |
| 2019/0343355 A1* | 11/2019 | Han | ..................... A47L 9/2842 |
| 2020/0081444 A1* | 3/2020 | Huang | ................. G05D 1/0231 |

* cited by examiner

*Primary Examiner* — Jaime Figueroa
*Assistant Examiner* — Arslan Azhar
(74) *Attorney, Agent, or Firm* — Lee, Hong, Degerman, Kang & Waimey PC

(57) ABSTRACT

Provided are an artificial intelligence cleaning robot which establishes a cleaning plan in consideration of a previous cleaning history, and a method thereof. A method of operating a cleaning robot comprises dividing a cleaning area into a plurality of areas, storing a history of previous cleaning performed by the cleaning robot in a memory, establishing a cleaning plan based on the previous cleaning history stored in the memory and controlling the cleaning to be performed according to the established cleaning plan. Accordingly, it is possible to establish a cleaning plan with the reflection of a previous cleaning history, so that the cleaning efficiency of the cleaning robot can be improved.

18 Claims, 11 Drawing Sheets

10 31 33 20

(a)

(b)

ARTIFICIAL INTELLIGENCE CLEANING ROBOT AND METHOD THEREOF

CROSS REFERENCE TO RELATED APPLICATIONS

Pursuant to 35 U.S.C. § 119(a), this application claims the benefit of earlier filing date and right of priority to Korean Patent Application No. 10-2019-0171584, filed on Dec. 20, 2019, the contents of which are hereby incorporated by reference herein in its entirety.

BACKGROUND

A cleaning robot is equipped with various sensors such as a camera, a distance sensor, a Lidar sensor, etc., moves everywhere in the house for itself without direct manipulation of a person, and cleans avoiding furniture and obstacles. Therefore, the cleaning robot is a device capable of providing a user with considerable convenience.

The cleaning robot is generally able to provide a plurality of preset cleaning methods, for example, zigzag cleaning, meticulous cleaning, and intensive cleaning, and to perform the cleaning by the cleaning method selected based on a user input.

However, a conventional cleaning robot simply performs cleaning according to the set cleaning method, and cannot establish a new cleaning plan for more efficiently performing the cleaning and cannot perform the cleaning accordingly.

SUMMARY

Various embodiments of the present disclosure relate to an artificial intelligence cleaning robot which establishes a cleaning plan in consideration of a previous cleaning history, and a method thereof.

In order to increase the cleaning efficiency of a cleaning robot, it is necessary to establish a cleaning plan and perform the cleaning in consideration of a previous cleaning history.

Therefore, the purpose of various embodiments of the present disclosure is to provide a method for establishing a current cleaning plan with the reflection of cleaning methods and history that has happened when performing previous cleaning such as end of cleaning due to lack of resources, e.g., water, detergent, and battery, or forcible end by a user.

Various embodiments of the present disclosure provide a cleaning robot capable of establishing a current cleaning plan with the reflection of history that has happened in previous tasks and of performing the cleaning in accordance with the established plan.

The technical problem to be overcome in this document is not limited to the above-mentioned technical problems. Other technical problems not mentioned can be clearly understood from the those described below by a person having ordinary skill in the art.

One embodiment is a cleaning robot comprising an input unit configured to obtain commands and setting information from a user, a memory configured to store a previous cleaning history and at least one processor configured to operatively connect to the input unit and the memory. The at least one processor is configured to divide a cleaning area into a plurality of areas, store the history of previous cleaning performed by the cleaning robot in the memory, establish a cleaning plan based on the previous cleaning history stored in the memory, and control the cleaning to be performed according to the established cleaning plan.

Another embodiment is a method of operating the cleaning robot. The method comprises dividing a cleaning area into a plurality of areas, storing a history of previous cleaning performed by the cleaning robot in a memory, establishing a cleaning plan based on the previous cleaning history stored in the memory and controlling the cleaning to be performed according to the established cleaning plan.

According to various embodiments, it is possible to establish a cleaning plan with the reflection of a previous cleaning history, so that the cleaning efficiency of the cleaning robot can be improved.

According to various embodiments, it is intended to clean an area that needs cleaning preferentially with the reflection of the previous cleaning history, the user satisfaction can be enhanced.

Advantageous effects that can be obtained from the present disclosure is not limited to the above-mentioned effects. Further, other unmentioned effects can be clearly understood from the following descriptions by those skilled in the art to which the present disclosure belongs.

BRIEF DESCRIPTION OF THE DRAWINGS

With regard to the description of the drawings, the same or similar reference numerals may be used for the same or similar components.

DETAILED DESCRIPTION OF THE EMBODIMENTS

Figure 1:
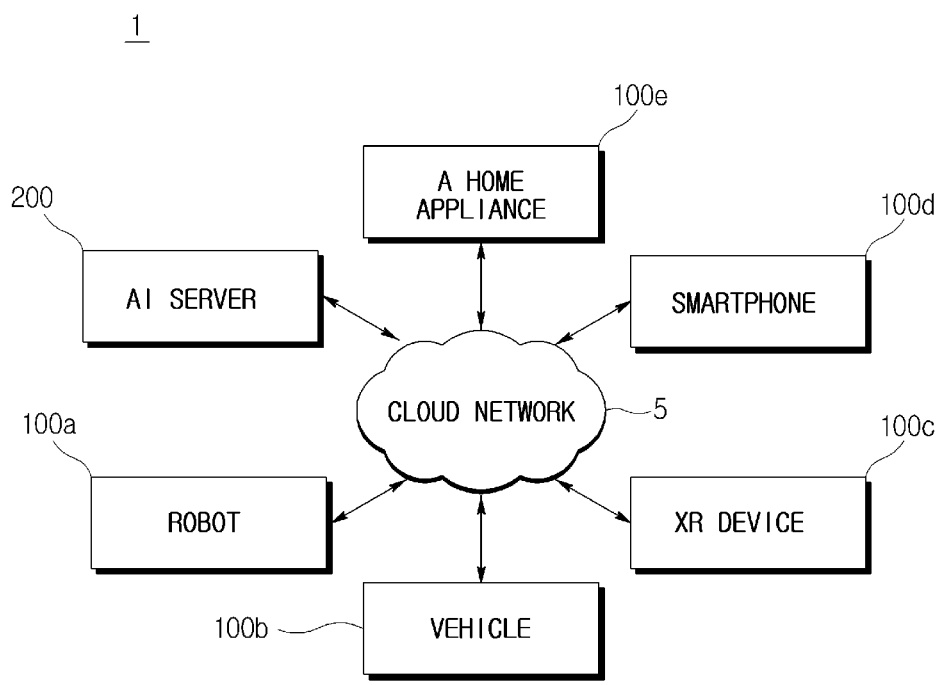
FIG. 1 is a view showing an artificial intelligence (AI) system according to various embodiments.

Hereinafter, embodiments disclosed in this specification will be described in detail with reference to the accompanying drawings. The same or similar elements will be denoted by the same reference numerals irrespective of drawing numbers, and repetitive descriptions thereof will be omitted.

A suffix "module" or "part" for the component, which is used in the following description, is given or mixed in consideration of only convenience for ease of specification, and does not have any distinguishing meaning or function per se. Also, the "module" or "part" may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present invention may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC). The ASIC may be resident within a user terminal.

In the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present invention are understood to be included in the accompanying drawings.

While terms including ordinal numbers such as the first and the second, etc., can be used to describe various components, the components are not limited by the terms mentioned above. The terms are used only for distinguishing between one component and other components.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

FIG. is a view showing an artificial intelligence (AI) system 1 according to various embodiments.

Referring to FIG. 1, in the AI system 1, one or more of an AI server 200, a robot 100a, a vehicle 100b, an XR device 100c, a smartphone 100d, or a home appliance 100e may be connected through a cloud network 5.

The cloud network 5 may mean a network which forms a part of a cloud computing infrastructure or exists within the cloud computing infrastructure. Here, the cloud network 5 may be configured with a 3G network, a 4G or long-term evolution (LTE) network, or a 5G network, etc.

According to various embodiments, the respective electronic devices 100a to 100e and 200 constituting the AI system 1 may be connected to each other through the cloud network 5. According to an embodiment, the respective electronic devices 100a to 100e and 200 can communicate with each other through a base station or an access point (AP), and also, they can communicate directly with each other without a base station or an AP.

The AI server 200 may include a server which performs artificial intelligence processing and a server which performs operations on big data.

The AI server 200 may be connected through the cloud network 5 to at least one of the robot 100a, the vehicle 100b, the XR device 100c, the smartphone 100d, or the home appliance 100e which are electronic devices including artificial intelligence technologies that constitute the AI system 1. The AI server 200 may support at least a portion of the artificial intelligence processing of the connected electronic devices 100a to 100e.

According to various embodiments, the AI server 200 instead of the electronic devices 100a to 100e may train an artificial neural network in accordance with a machine learning algorithm and may directly store a learning model or transmit to the electronic devices 100a to 100e.

According to various embodiments, the AI server 200 may receive input data from the electronic devices 100a to 100e, may infer a result value for the received input data by using the learning model, and may generate a response or a control command based on the inferred result value to transmit it to the electronic devices 100a to 100e.

According to other various embodiments, the electronic devices 100a to 100e may infer the result value for the input data by directly using the learning model and may generate a response or a control command based on the inferred result value.

The AI technology is applied to the robot 100a and the robot 100a may be implemented as a guide robot, a transport robot, a cleaning robot, a wearable robot, an entertainment robot, a pet robot, an unmanned flying robot, or the like.

The robot 100a may include a robot control module for controlling its operations, and the robot control module may mean a software module or may mean a chip obtained by implementing the software module by hardware.

The robot 100a uses sensor information obtained from various kinds of sensors, thereby obtaining the state information of the robot 100a, detecting (recognizing) ambient environment and objects, generating map data, determining a travel path and a driving plan, determining a response to user interaction, or determining the operation.

Here, in order to determine the travel path and the driving plan, the robot 100a may use the sensor information obtained from at least one sensor among a lidar, a radar, and a camera.

The robot 100a may perform the above operations by using the learning model composed of at least one artificial neural network. For example, the robot 100a may recognize ambient environment and objects by using the learning model and may determine the operation by using information on the recognized ambient environment or the recognized object. Here, the learning model may be trained directly by the robot 100*a* or may be trained by external devices such as the AI server 200, etc.

Here, the robot 100*a* may perform the operation by producing a result through the direct use of the learning model and may also perform the operation by transmitting the sensor information to external devices such as the AI server 200, etc., and by receiving the result produced accordingly.

The robot 100*a* may use at least one of the map data, the object information detected from the sensor information, or the object information obtained from the external device to determine the travel path and the driving plan, and may be made to travel along the determined travel path and driving plan by controlling a driving unit.

The map data may include object identification information on various objects disposed in a space where the robot 100*a* moves. For example, the map data may include the object identification information on fixed objects such as a wall, a door, etc., and movable objects such as a flowerpot, a desk, etc. Also, the object identification information may include names, types, distances, locations, etc.

Also, the robot 100*a* may perform the operation or travel by controlling the driving unit on the basis of the control/interaction of the user. Here, the robot 100*a* may obtain intent information of the interaction according to the action or voice utterance of the user and may determine a response based on the obtained intent information and perform the operation.

Figure 2:
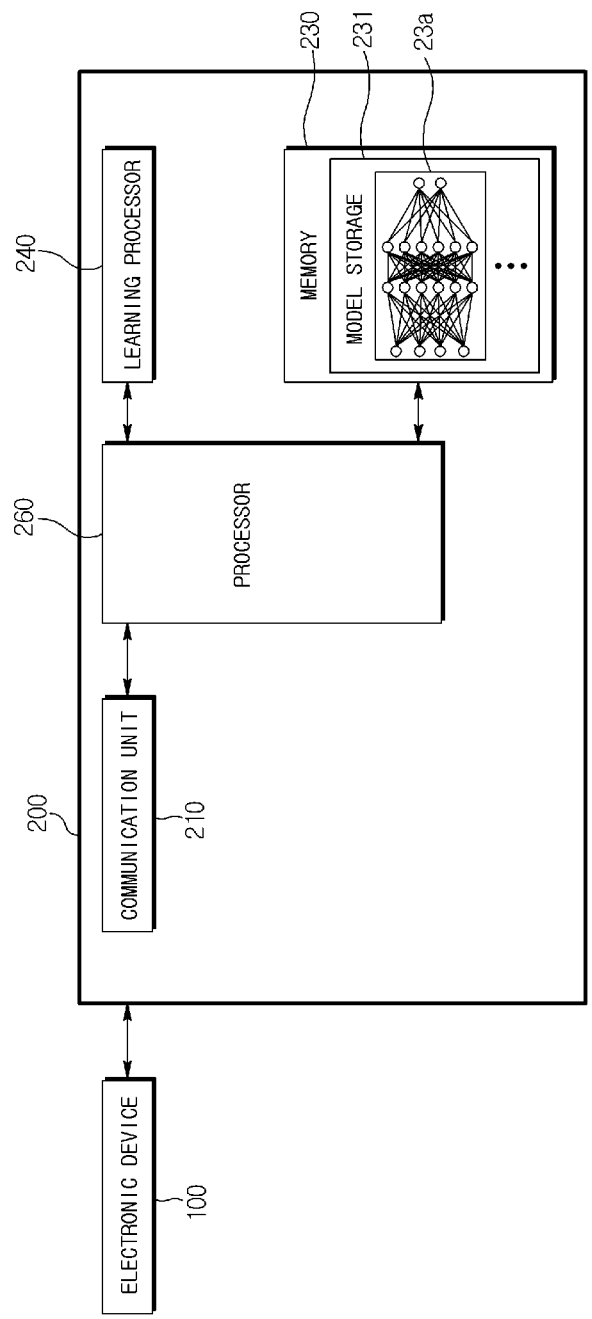
FIG. 2 is a view showing an AI server including AI technologies according to various embodiments.

FIG. 2 is a view showing the AI server 200 including AI technologies according to various embodiments.

Referring to FIG. 2, the AI server 200 may mean a device which trains the artificial neural network by using the machine learning algorithm or mean a device which uses the trained artificial neural network. Here, the AI server 200 may be composed of a plurality of servers to perform distributed processing or may be defined as a 5G network. According to the embodiment, the AI server 200 may be included as a component of the cleaning robot 100. Also, the AI server 200, together with the cleaning robot 100, may perform at least a portion of the artificial intelligence processing. According to the embodiment, when the cleaning robot 100 has insufficient computing power, the cleaning robot 100 may request the AI server 200 to perform a part of or all the artificial intelligence processing.

The AI server 200 may include a communication unit 210, a memory 230, a learning processor 240, and a processor 260.

The communication unit 210 may transmit and receive data to and from external devices such as the cleaning robot 100. According to the embodiment, the communication unit 210 may transmit and receive data to and from the external devices through the cloud network 5. According to another embodiment, the communication unit 210 may directly transmit and receive data to and from the external devices.

The memory 230 may include a model storage 231. The model storage 231 may store a model (or an artificial neural network 231*a*) which is being trained or has been trained through the learning processor 240.

The learning processor 240 may generate the learning model obtained by training the artificial neural network 231*a* through the use of learning data. The learning model may be used with being mounted on the AI server 200 of the artificial neural network or with being mounted on the external device such as the cleaning robot 100.

The learning model may be implemented in hardware, software, or by a combination of hardware and software. When the learning model is partially or wholly implemented in software, one or more instructions constituting the learning model may be stored in the memory 230.

The processor 260 may infer a result value for a new input data by using the learning model and may generate responses or control commands based on the inferred result value.

Figure 3:
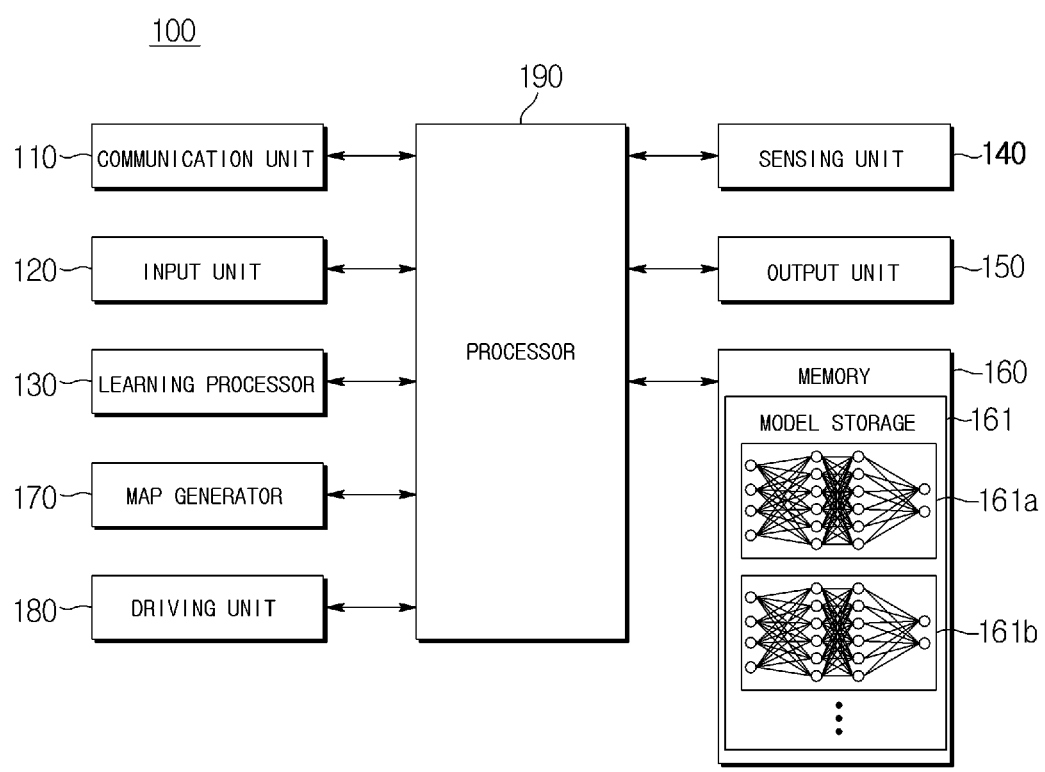
FIG. 3 is a view showing a cleaning robot which establishes a cleaning plan based on a previous cleaning history in accordance with various embodiments.

FIG. 3 is a view showing the cleaning robot 100 which establishes a cleaning plan based on a previous cleaning history in accordance with various embodiments.

The cleaning robot 100 may be a mobile device including a vehicle or an electric vehicle. Otherwise, the cleaning robot 100 may be one part, chip, module, electronic control unit (ECU) that is provided to the mobile device and performs assigned functions. The cleaning robot 100 including artificial intelligence technologies may be referred to as an AI device.

Referring to FIG. 3, the cleaning robot 100 may include a communication unit 110, an input unit 120, a learning processor 130, a sensing unit 140, an output unit 150, a memory 160, a map generator 170, a driving unit 180, and a processor 190.

According to various embodiments, the communication unit 110 may transmit and receive data to and from external devices such as another electronic device or the AI server 200 by using wired and wireless communication technologies. For example, the communication unit 110 may transmit and receive the sensor information, a user input, the learning model, a control signal, etc., to and from external devices.

Here, the communication unit 110 may use wireless communication technologies including a Global System for Mobile communication (GSM), Code Division Multi Access (CDMA), Long Term Evolution (LTE), fifth generation communication (5G), Wireless LAN (WLAN), Wireless Fidelity (Wi-Fi), Dedicated Short Range Communication (DSRC), Bluetooth™, Radio Frequency Identification (RFID), Infrared Data Association (IrDA), ZigBee, and Near Field Communication (NFC) or wired communication technologies including Local Area Network (LAN), Wide Area Network (WAN), Metropolitan Area Network (MAN), and Ethernet.

According to various embodiments, the input unit 120 may obtain various types of data. The input unit 120 may include a camera for inputting an image signal, a microphone for receiving an audio signal, and a user input unit for receiving information or commands from a user. Here, the camera or the microphone may be treated as a kind of sensor, and the signal obtained from the camera or microphone may be referred to as sensing data or sensor information. Therefore, the camera or microphone may be included in the sensing unit 140.

The input unit 120 may obtain learning data for model learning and obtain input data, etc., to be used when obtaining an output by using the learning model. The input unit 120 may obtain raw input data, and, in this case, the processor 190 or the learning processor 130 may extract input features as preprocessing for the input data.

According to various embodiments, the learning processor 130 may be configured to receive, classify, store, and output information to be used for data mining, data analysis, intelligent decision making, and machine learning algorithms and technologies.

The learning processor 130 may include one or more memory units configured to store data received, detected, sensed, generated, predefined, or in another way output by the cleaning robot 100 or data received, detected, detected, generated, predefined, or in another way output by another component, device, electronic device or a device communicating with the electronic device.

The learning processor 130 may include a memory integrated with or implemented in the cleaning robot 100. In some embodiments, the learning processor 130 may be implemented by using the memory 160.

Optionally or additionally, the learning processor 130 may be implemented by using a memory related to the cleaning robot 100, for example, an external memory coupled directly to the cleaning robot 100 or a memory maintained in a server communicating with the cleaning robot 100.

In another embodiment, the learning processor 130 may be implemented by using a memory maintained in a cloud computing environment or by using another remote memory location accessible by the cleaning robot 100 through a communication method such as a network.

The learning processor 130 may be generally configured such that data is stored in one or more databases in order that the data is identified, indexed, categorized, manipulated, stored, retrieved and output for the purpose that data is used in supervised learning, unsupervised learning, reinforcement learning, data mining, predictive analytics or in other electronic devices.

Through use of any of a variety of different types of data analysis algorithms and machine learning algorithms, the information stored by the learning processor 130 may be used by one or more other controllers of the cleaning robot 100 or the processor 190.

Examples of such algorithms include k-nearest neighbor system, fuzzy logic (e.g., probability theory), neural network, Boltzmann machine, vector quantization, pulse neural network, support vector machine, maximum margin classifier, hill climbing, inductive logic system Bayesian network, Petri Net (e.g., finite state machine, Mealy machine, Moore finite state machine), classifier tree (e.g., perceptron tree, support vector tree, Markov tree, decision tree forest, random forest), stake model and system, artificial fusion, sensor fusion, image fusion, reinforcement learning, augmented reality, pattern recognition, automated planning, and the like.

The learning processor 130 may store an artificial neural network (ANN) model used in the machine learning algorithm in the memory 160, generate the learning model obtained by training the artificial neural network model and store the learning model in the memory 160. In addition, the learning processor 140 may perform tasks such as classification, detection, and recognition based on data input by using the learning model.

Artificial intelligence refers to the field of studying artificial intelligence or methodology for making artificial intelligence, and the machine learning refers to the field of defining various issues dealt with in the field of artificial intelligence and studying methodology for solving the various issues. The machine learning is defined as an algorithm that enhances the performance of a certain task through steady experience with the certain task.

The artificial neural network is a model used in machine learning and may mean a whole model which has a problem-solving ability and is composed of artificial neurons (nodes) that form a network by synaptic connections. The artificial neural network may be defined by a connection pattern between neurons of different layers, a learning process for updating model parameters, and an activation function for generating an output value.

Figure 4:
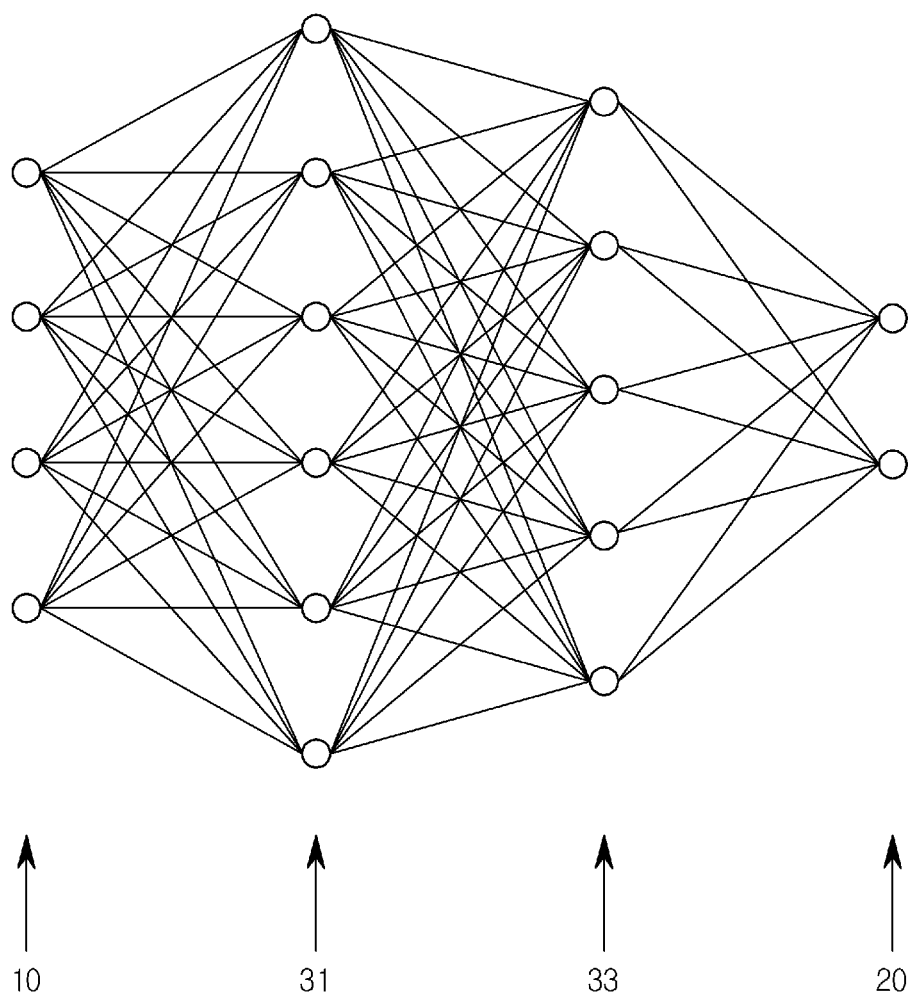
FIG. 4 is a view showing an example of a fully connected artificial neural network structure.

FIG. 4 is a view showing an example of a fully connected artificial neural network structure.

Referring to FIG. 4, the artificial neural network may include an input layer 10, an output layer 20, and optionally one or more hidden layers 31 and 32. Each layer includes one or more neurons which correspond to the neurons in the neural network, and the artificial neural network may include a synapse that links a node in one layer with a node in another layer. In the artificial neural network, a node may receive input signals input through the synapse, and generate an output value based on an activity function of a weight and a bias for each input signal. The output value of each node may act as an input signal to the next layer through the synapse. An artificial neural network in which all the nodes of one layer and all the nodes of the next layer are connected through the synapses may be referred to as a fully connected artificial neural network.

Parameters of the artificial neural network model may mean parameters determined by learning, and may include the weight of the synaptic connections and bias of neurons, etc. In addition, a hyper parameter may mean a parameter to be set before learning in the machine learning algorithm, and may include a learning rate, the number of times of the repetition, a mini batch size, an initialization function, and the like.

Machine learning, which is implemented by a deep neural network (DNN) including a plurality of hidden layers among artificial neural networks, is called deep learning, and the deep learning is part of the machine learning. Hereinafter, the machine learning may be used as meaning the deep running.

Figure 5:
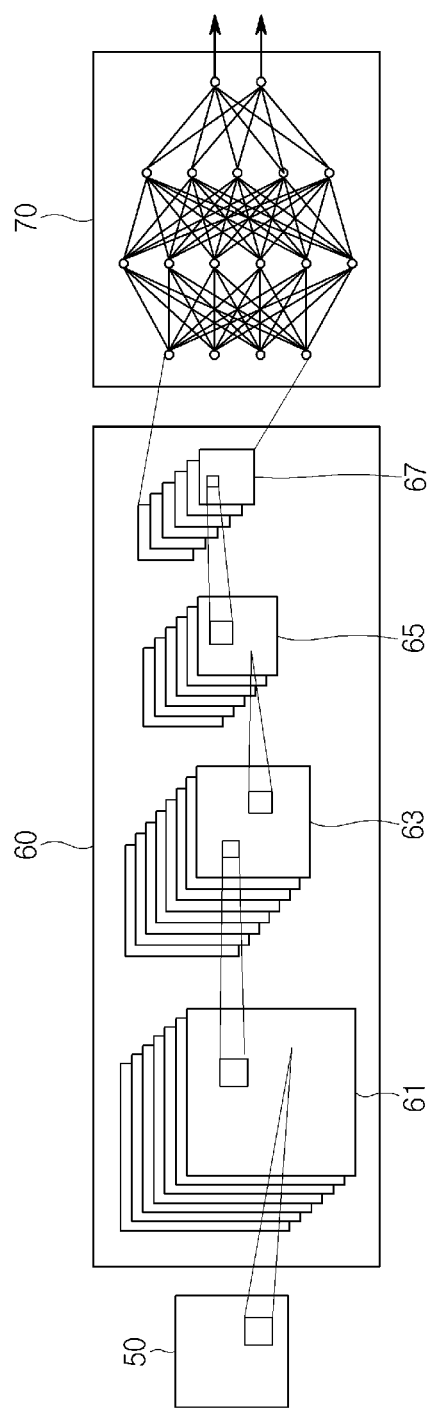
FIG. 5 is a view showing an example of a structure of a convolutional neural network (CNN), that is, a kind of a deep neural network.

FIG. 5 is a view showing an example of a structure of a convolutional neural network (CNN), that is, a kind of the deep neural network.

In the identification of structural spatial data such as images, moving pictures, and character strings, a convolutional neural network structure as shown in FIG. 3 may be more effective. The convolutional neural network can effectively recognize features associated with adjacent images while maintaining spatial information of the image.

Referring to FIG. 5, the convolutional neural network may include a feature extraction layer 60 and a classification layer 70. The feature extraction layer 60 may synthesize those located spatially close in the image by using convolution and then extract the features of the image.

The feature extraction layer 60 may be configured by stacking a plurality of convolution layers 61 and 65 and a plurality of pooling layers 63 and 67. By the convolution layers 61 and 65, the activation function may be applied after a filter is applied to input data. The convolution layers 61 and 65 may include a plurality of channels. By each of the channels, different filters and/or different activation functions may be applied. The result of the convolution layers 61 and 65 may be a feature map. The feature map may be data in the form of a two-dimensional matrix. The pooling layers 63 and 67 may receive output data of the convolution layers 61 and 65, that is, the feature map, as an input, and may be used to reduce the size of the output data or to emphasize specific data. The pooling layers 63 and 67 may generate output data by applying a max pooling function which selects the maximum value among some data of the output data of the convolution layers 61 and 65, an average pooling function which selects an average value, and a min pooling function which selects the minimum value.

The feature map which is generated through a series of the convolution layers and the pooling layers may become gradually smaller in size. A final feature map generated through the last convolution layer and the last pooling layer may be converted to have a one-dimensional form and be input to the classification layer 70. The classification layer 70 may have the fully connected artificial neural network structure shown in FIG. 2. The number of input nodes in the classification layer 70 may be equal to a number obtained by multiplying the number of elements of a matrix of the final feature map by the number of channels.

In addition to the above-described convolutional neural network, a recurrent neural network (RNN), a long short-term memory (LSTM) network, and gated recurrent units (GRU) may be also used as the deep neural network structure. The recurrent neural network can classify or predict by learning sequential data. The recurrent neural network has a recurrent structure therein, so that the learning of the past time is multiplied by a weight and is reflected in the current learning. Thus, the current output result is affected by the output result from the past time, and the hidden layer performs a kind of memory function. The recurrent neural network may be used to analyze a voice waveform and to perform a machine translation, may be used to identify front and back components of a text sentence, and to generate a text, or may be used to recognize voices.

The purpose of artificial neural network learning is regarded as determining a model parameter that minimizes a loss function. The loss function may be used as an index for determining an optimal model parameter in the learning process of the artificial neural network. In the case of a fully connected artificial neural network, the weight of each synapse may be determined by learning. In the case of the convolutional neural network, a filter of the convolution layer for extracting the feature map may be determined by learning.

The machine learning may be classified into supervised learning, unsupervised learning, and reinforcement learning on the basis of a learning method.

The supervised learning refers to a method of training the artificial neural network in a state in which a label for learning data is given. The label may mean a correct answer (or a result value) that the artificial neural network must infer when the learning data is input to the artificial neural network. The unsupervised learning may refer to a method of training the artificial neural network in a state in which a label for learning data is given. The reinforcement learning may refer to a learning method of training an agent defined in a certain environment to select a behavior or a behavior sequence that maximizes the cumulative reward in each state.

The learning processor 130 may train models 161a and 161b composed of artificial neural networks by using the learning data. According to the embodiment, the learning processor 130 may train the models 161a and 161b composed of a plurality of artificial neural networks. In this case, the learning data for each model may vary depending on the purpose of each model. Here, the trained artificial neural network may be referred to as a learning model. The learning model may be implemented in hardware, software, or by a combination of hardware and software. The learning model may be used to infer a result value for a new input data instead of the learning data and may be used as a basis for determination to perform a certain operation. According to the embodiment, the learning processor 130 may perform the artificial intelligence processing together with the learning processor 240 of the AI server 200.

The learning processor 130 may be integrated with the processor 190 of the cleaning robot 100. In addition, the learning model which is executed in the learning processor 130 may be implemented in hardware, software, or by a combination of hardware and software. When the learning model is partially or wholly implemented in software, one or more instructions constituting the learning model may be stored in the memory 160, an external memory coupled directly to the cleaning robot 100 or a memory which is maintained in an external device. The learning processor 130 may realize an AI processing program by reading the instruction from the memory and executing the instruction.

According to various embodiments, the sensing unit 140 may obtain at least one of information on the inside of the cleaning robot 100, information on ambient environment of the cleaning robot 100, and user information by using various sensors.

Here, the sensing unit 140 may include at least one of a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, a camera, LIDAR, radar, a pressure sensor, and a force sensor.

According to various embodiments, the output unit 150 may generate an output related to a visual sense, an auditory sense, or a tactile sense, etc. The output unit 150 may include a display and/or LED for outputting visual information, a speaker for outputting auditory information, a haptic module for outputting tactile information, and the like.

According to various embodiments, the memory 160 may store data supporting various functions of the cleaning robot 100. For example, the memory 160 may include input data obtained by the input unit 120, learning data, a learning model, a learning history, instructions for the learning processor 130, instructions for the processor 190, and a model (or an artificial neural network), etc., which is being trained or has been trained through the learning processor 130. Further, the memory 160 may store a preset cleaning method of the cleaning robot 100. When a map of a house is generated by the map generator 170, the memory 160 may also store the generated map.

According to various embodiments, the map generator 170 may generate a map of a cleaning area (e.g., a house) to be cleaned.

When the map generator 170 is in an initial operation or when a map of the cleaning area is not stored in the memory 160, the map generator 170 may scan the entire cleaning area by using a 3D sensor such as radar or lidar, or may obtain obstacle information while traveling in the entire cleaning area. Based on this, the map generator 170 is able to generate a map of the cleaning area.

Before performing the cleaning, the map generator 170 determines whether there is a difference from the map stored in the memory 160 by using the 3D sensor, for example, the detection of a new obstacle or the disappearance of an existing obstacle. Then, the map generator 170 can update the map on the basis of the determination result. According to another embodiment, if, during performing the cleaning, the map generator 170 detects a new obstacle different from that of the map or recognizes the change in the position of the obstacle or the loss of the obstacle, the map generator 170 can update the map on the basis of the detection or recognition.

The map generator 170 may divide the cleaning area into a plurality of areas on the basis of the obstacle information or information on protruding portions obtained through the 3D sensor or a contact sensor and include the areas in the map. According to the embodiment, the map generator 170 may divide the cleaning area on the basis of immovable obstacles such as a wall.

The map generator 170 may process the shape of the area based on the shape of a typical home room, for example, a square shape. In addition, the map generator 170 may process the shape of the area by deleting or reducing an area inaccessible due to the obstacles.

The map generator 170 may generate a basic map and an area map. The basic map may represent that a cleaning area that can be cleaned by the cleaning robot 100 is marked with as an exterior line. The area map may display the plurality of divided areas on the basic map with the distinction of them. on the basic map are divided and displayed. The map generator 170 may include a location of a connection passage connecting areas on the area map.

In addition, the map generator 170 may display obstacles having a size larger than a certain size on the map, depending on the obstacle. For example, the map generator 170 may display furniture, such as a chair, bed, TV, sofa, or the like, which have a size larger than a certain size, on the map, and may not display toys which have a small size or are easily moveable, or the like, on the map.

The map generator 170 may display and store a location of a charging stand for charging the cleaning robot 100 on the map.

After the map is generated, the map generator 170 may add obstacles that are repeatedly detected at a fixed location to the map, and may not add them to the map when temporarily detected.

Figure 6:
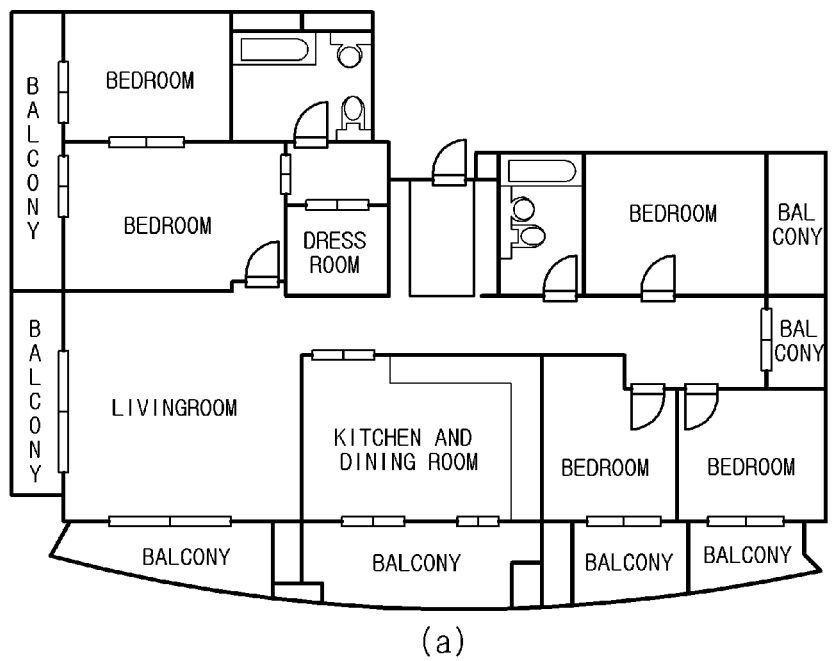
FIG. 6 is a view showing an example of an area map generated by a map generator.
Figure 6:
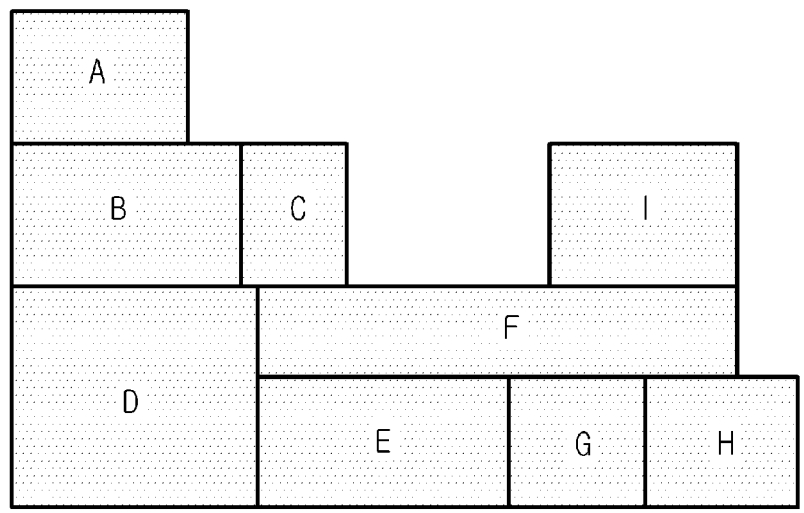

FIG. 6 is a view showing an example of the area map generated by the map generator 170.

Referring to FIG. 6, a plan view of an actual living space is shown in (a) and an area map generated based on the plan view by the map generator 170 is shown in (b). On the basis of the obstacle information in the actual living space obtained by the scan by the 3D sensor and/or by the running of the cleaning robot 100, the map generator 170 may, as shown in (b) of FIG. 6, generate a map displaying the entire cleaning area and the plurality of cleaning areas obtained by dividing the entire cleaning area, and may store the map in the memory 170.

According to various embodiments, the driving unit 180 may include a traveling driving unit that controls the movement of the cleaning robot 100 and a cleaning driving unit for driving components required for cleaning.

The traveling driving unit may move the cleaning robot 100 in a particular direction or to a particular position. According to the embodiment, the cleaning robot 100 includes two wheels, a left wheel and a right wheel, and the traveling driving unit may include a motor for driving the left wheel and a motor for driving the right wheel. According to another embodiment, the cleaning robot 100 may include only one wheel.

The cleaning driving unit may include at least one of a motor for a suction unit for sucking foreign substances such as dust, garbage, etc., and a motor for mopping. The cleaning driving unit rotates the motor to suck air through the suction unit, so that dust around the suction unit can suck foreign substances such as garbage, etc. The suction unit may include a brush or the like as a means for collecting the foreign substances, and the cleaning driving unit may further include a motor for rotating the brush. The cleaning robot 100 may be configured to at least partially contact the mop with the floor surface when mopping and to separate the mop from the ground when not mopping.

According to various embodiments, the processor 190 may determine at least one executable operation of the cleaning robot 100 on the basis of information that is determined or generated by using a data analysis algorithm or a machine learning algorithm. In addition, the processor 190 may control the components of the cleaning robot 100 and perform the determined operation. A program used by the processor 190 performing the operation may be stored in the memory 160.

The processor 190 may request, search, receive or utilize the data of the learning processor 130 or the memory 160 and may control the components of the cleaning robot 100 such that operations which are predicted or are determined to be desirable among the at least one executable operation are performed.

When the processor 190 needs to be associated with an external device in order to perform the determined operation, the processor 180 may generate a control signal for controlling the corresponding external device and transmit the generated control signal to the corresponding external device.

The processor 190 may obtain information on the intent of the user input and determine user's requirements based on the obtained intent information.

The processor 190 may collect history information including operation contents of the cleaning robot 100 or a user's feedback on the operation, and the like, and store the history information in the memory 160 or in the learning processor 130, or transmit the history information to the external device such as the AI server 200, etc. The collected history information may be used to update the learning model.

The processor 190 may control at least some of the components of the cleaning robot 100 in order to execute an application program stored in the memory 160. In addition, the processor 190 may operate two or more of the components included in the cleaning robot 100 in combination with each other in order to execute the application program.

Figure 7:
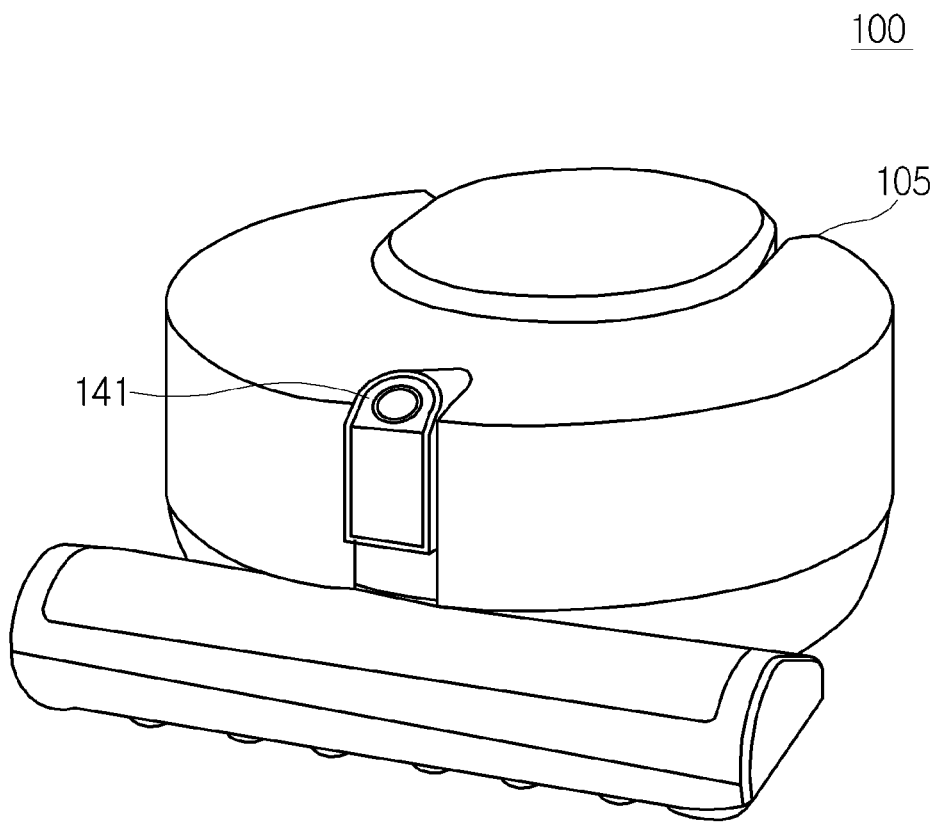
FIG. 7 is a perspective view of the cleaning robot according to various embodiments.

FIG. 7 is a perspective view of the cleaning robot 100 according to various embodiments.

Referring to FIG. 7, the cleaning robot 100 may include a cleaner body 105 and a 3D sensor 141 of the sensing unit 140. The 3D sensor 141 may irradiate laser or ultrasonic waves forward and may receive the reflected laser or ultrasonic waves. The sensing unit 140 may obtain depth information by using a time difference from when the 3D sensor 141 irradiates the laser to when the 3D sensor 141 receives the reflected laser.

The cleaner body 105 may include components other than the sensing unit 140 among the components shown in FIG. 3.

Figure 8:
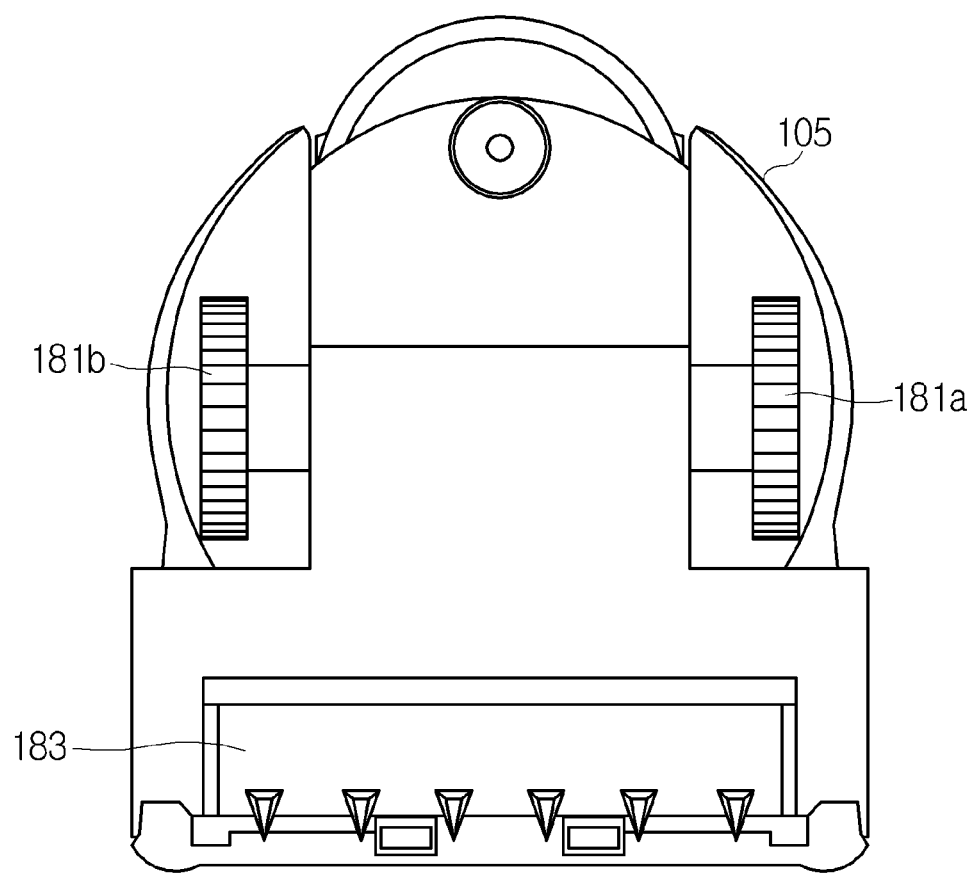
FIG. 8 is a bottom view of the cleaning robot according to various embodiments.

FIG. 8 is a bottom view of the cleaning robot 100 according to various embodiments.

Referring to FIG. 8, the bottom surface of the cleaning robot 100 may include a left wheel 181*a*, a right wheel 181*b*, and a suction unit 183 which are connected to the cleaner body 105.

The left wheel 181*a* and the right wheel 181*b* may cause the cleaner body 105 to travel in accordance with the control of the driving unit 180. The suction unit 183 may suck dust or garbage on the floor surface.

The suction unit 183 may further include a filter (not shown) which collects foreign substances in the sucked airflow and a foreign substance receiver (not shown) where the foreign substances collected by the filter are accumulated.

Figure 9:
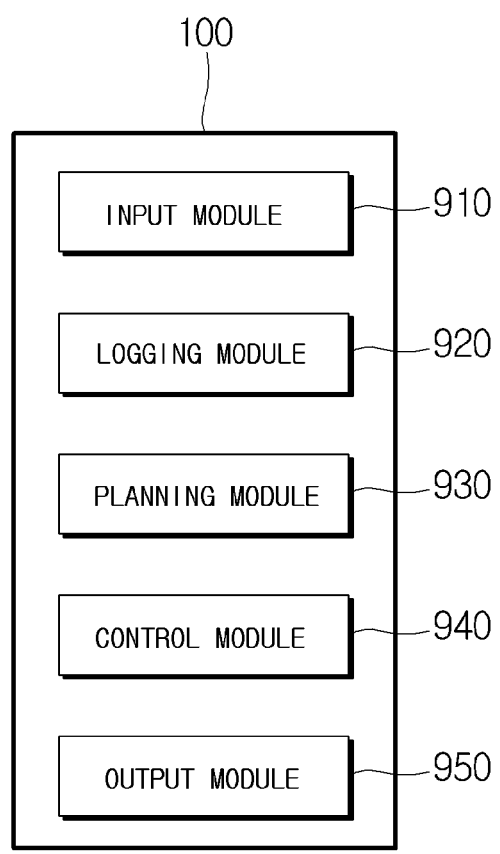
FIG. 9 is a block diagram showing functions which are proposed in the present disclosure and allow a processor and/or a learning processor of the cleaning robot to establish a current cleaning plan with the reflection of the previous cleaning history in accordance with various embodiments.

FIG. 9 is a block diagram showing functions which are proposed in the present disclosure and allow the processor 190 and/or the learning processor 130 of the cleaning robot 100 to establish a current cleaning plan with the reflection of the previous cleaning history in accordance with various embodiments. The block diagram of FIG. 9 shows an example that simply shows software components required for the cleaning robot 100 to establish the current cleaning plan with the reflection of the previous cleaning history. According to the embodiment, the components of the block diagram of FIG. 9 may be partially omitted. According to another embodiment, other components not shown may be further added. In addition, several components may be integrated with each other, or one component may be divided into a plurality of components. Each component shown in FIG. 9 may be implemented with a separate program. Otherwise, some of the components may be closely related to each other and implemented with one program.

Referring to FIG. 9, the processor 190 and/or the learning processor 130 of the cleaning robot 100 may perform functions of an input module 910, a logging module 920, a planning module 930, a control module 940, and an output module 950.

According to various embodiments, the input module 910 may receive a user setting command or operation command in association with the input unit 120 or the communication unit 110 of the cleaning robot 100. In one embodiment, the user may transmit an automatic cleaning start command to the cleaning robot 100 by using remote control, and the input module 910 may receive the automatic cleaning start command of the user through the input unit 120. In another embodiment, the user may transmit a command to set a specific area to be cleaned to the cleaning robot 100 by using a smartphone or a PC, and the input module 910 may receive the user setting command through the communication unit 110.

According to various embodiments, the output module 950 may provide various information to a user in conjunction with the output unit 150 and/or the communication unit 110. According to the embodiment, when the output module 950 receives the user input through the input module 910, information indicating that the input has been received may be output by the output module 950 through the output unit 150. For example, if user's press of a power button is recognized by the input module 910, the output module 950 may emit a voice message "power is on" through the output unit 150. Alternatively, the output module 950 may transmit, through the communication unit 110, a notification indicating that power is applied to the user's smartphone or PC. In addition, when the input module 910 receives a user's request for the area map, the output module 950 may transmit the area map stored in the memory 160 to the user terminal through the communication unit 110. If the area map has not been generated, a message indicating that the area map has not been generated may be transmitted to the user terminal through the communication unit 110 or may be notified to the user through the output unit 150.

According to another embodiment, the output module 950 may transmit the state of the cleaning robot 100 to the user terminal through the communication unit 110 or may notify the user through the output unit 150. For example, the output module 950 may transmit a message including information such as "automatic cleaning received," "cleaning plan completed," "start cleaning," "cleaning completed," and "stop cleaning due to no battery" to the user terminal or may notify the user by means of a voice message through a speaker of the output unit 150 or by means of a visual message through an LED.

According to various embodiments, the logging module 920 may log information related to the cleaning from the start of the cleaning to the completion of the cleaning and may store the information in the memory. For example, the logging module 920 may log information related to the cleaning method (e.g., zigzag cleaning, meticulous cleaning, intensive cleaning) used for each cleaning area, cleaning time, and moving path of the cleaning robot 100. Here, the respective cleaning methods may have different cleaning orders, cleaning strengths, cleaning directions, cleaning ranges, and the like. In addition, the logging module 920 may also log information related to a start area (e.g., "A" of FIG. 6), an end area (e.g., "G" of FIG. 6), and a moving path between the areas (e.g., A→B→D→E→F→I→H→G in FIG. 6). In addition, the logging module 920 may tag whether or not the cleaning has been completed for each area, and may log information on whether the cleaning robot 100 has ended the cleaning earlier without completing the cleaning for all areas or whether the cleaning has been forcibly ended by the user.

The logging history stored in the memory 160 by the logging module 920 may be referred to when planning for the next operation of the cleaning robot 100. According to the embodiment, the logging history stored in the memory 160 may be referred to by another cleaning robot, and in this case, the output module 950 may transmit the logging history stored in the memory 160 to other cleaning robots or servers through the communication unit 110.

According to various embodiments, the planning module 930 may set a cleaning plan of the cleaning robot 100. According to the embodiment, the planning module 930 may determine a cleaning priority and a cleaning method for each area. The processor 190 may cause the planning module 930 to perform when the processor 190 recognizes that the user has turned on the power through the input module 910 or receives an automatic cleaning command.

The planning module 930 may analyze and learn the logging history storing the previous tasks of the cleaning robot 100.

On the basis of the logging history stored in the memory 160, the planning module 930 may analyze information on the used cleaning method, the moving path, whether the cleaning has been completed for each area, the earlier end of the cleaning, the forcible end of the cleaning, etc. For example, the planning module 930 may recognize the cleaning state of a specific area on the basis of the information on the earlier end of the cleaning or the forcible end of the cleaning. In addition, the planning module 930 may learn an optimal moving path by analyzing the moving path and cleaning time. Also, the planning module 930 may learn a user preferred cleaning method for each area through the analysis of the cleaning method for each area.

According to the embodiment, the planning module 930 may learn the user preferred cleaning method for each area through the maximum frequency analysis that selects the most used cleaning method in the past cleaning method for each area. According to another embodiment, the planning module 930 receives a cleaning date or cleaning day, whether the previous cleaning has been completed, a degree of contamination, and an area number and trains the neural network model by using the learning data which provides the cleaning method as a result value, so that it is possible for the planning module 930 to learn the user preferred cleaning method for each area.

The planning module 930 may determine the degree of indoor contamination for each area. According to the embodiment, the planning module 930 may obtain information indicating the degree of contamination of each area from external electronic devices such as an air cleaner which detects the degree of contamination of the area or a PC which executes software which detects the degree of contamination from images captured by a camera, and may determine the degree of contamination of the area by using the logging history storing the results of the previous cleaning as well as the information. For example, if the logging history says that the cleaning is forcibly or earlier ended without cleaning a specific area in the previous cleaning, the planning module 930 may set the degree of contamination of the corresponding area to be higher.

The planning module 930 may plan the operation of the cleaning robot 100 on the basis of the degree of contamination for each area, the previous cleaning history, and the user preferred cleaning method for each area. According to the embodiment, the planning module 930 may determine a cleaning priority based on the degree of contamination for each area. Also, on the basis of the previous cleaning history and the degree of contamination for each area, the planning module 930 may set an optimum cleaning method for each area that can minimize the degree of contamination for each area after cleaning. Also, on the basis of the state of resources required for cleaning, for example, a battery charge state, a water level, and detergent state, the planning module 930 may estimate time available for cleaning according to the exhaustion of resources and may adjust the priority and cleaning method on the basis of the estimated time available for cleaning. For example, in the case of an area requiring wet mop cleaning, the planning module 930 may give a higher priority to an area with a low degree of contamination and may give a lower priority to an area with a high degree of contamination. When the time available for cleaning is short, the planning module 930 may give a high priority to an area with a high degree of contamination and may give a low priority to an area with a low degree of contamination. Also, the planning module 930 may use an intensive cleaning method with a high possibility of decontamination for the area with a high degree of contamination, and may use a zigzag cleaning method for the area with a low degree of contamination.

According to the embodiment, the planning module 930 may determine a cleaning priority and a cleaning method for each area by using the trained artificial neural network model. The planning module 930 may include a separate trained artificial neural network model for determining the cleaning priority and the cleaning method. According to another embodiment, the planning module 930 may determine the cleaning priority and the cleaning method in one artificial neural network model.

The planning module 930 may determine the cleaning priority by using a trained artificial neural network which receives the degree of contamination for each area, a cleaning method performed immediately before, whether the previous cleaning has been completed, the type of the cleaning, and total time available for cleaning and outputs the cleaning priority or a cleaning order for each area.

Also, the planning module 930 may determine the cleaning method for each area by using a trained artificial neural network model which receives the preferred cleaning method, the type of the cleaning, the cleaning time for each cleaning method, the time available for cleaning, and the degree of contamination and outputs the cleaning method. According to another embodiment, the planning module 930 may determine the cleaning method for each area by using a trained artificial neural network model which receives the preferred cleaning method for each area, the type of the cleaning, the cleaning time, the total time available for cleaning, the cleaning priority and outputs the cleaning method for each area.

The trained artificial neural network model described above may be an artificial neural network model trained on the basis of information derived from the previous cleaning history.

The control module 940 may control the driving unit 180 such that the cleaning robot 100 operates according to the cleaning priority for each area, the cleaning order for each area, and the cleaning method for each area set by the planning module 930. The cleaning history of the cleaning robot 100 under the control of the control module 940 is logged by the logging module 920 and is stored in the memory 160. Then, the cleaning history can be used to establish the next cleaning plan.

As suggested in the above, the cleaning robot 100 proposed by the present disclosure can maximize the efficiency of the cleaning by establishing the cleaning plan based on the previous cleaning logging history.

According to various embodiments, the cleaning robot (e.g., the cleaning robot 100 of FIG. 3) may include an input unit (e.g., the input unit 120 of FIG. 3) configured to obtain commands and setting information from the user, a memory (e.g., the memory 160 of FIG. 3) configured to store the previous cleaning history, and at least one processor (e.g., the processor 190 and the learning processor 130 of FIG. 3) configured to operatively connect to the input unit and the memory.

According to various embodiments, the at least one processor may divide the cleaning area into a plurality of areas, store the history of a previous cleaning performed by the cleaning robot in the memory, establish a cleaning plan based on the previous cleaning history stored in the memory, and control the cleaning to be performed according to the established cleaning plan.

According to various embodiments, the at least one processor may establish the cleaning plan by learning the user preferred cleaning method for each of the plurality of areas on the basis of the previous cleaning history, by determining the degree of contamination for each of the plurality of areas on the basis of at least a portion of the previous cleaning history, by determining the cleaning priority on the basis of the degree of contamination for each of the plurality of areas, and by determining the cleaning method for each of the plurality of areas on the basis of the user preferred cleaning method for each of the plurality of areas and the degree of contamination for each of the plurality of areas.

According to various embodiments, the at least one processor may learn the user preferred cleaning method for each of the plurality of areas through the maximum frequency analysis that selects the most used cleaning method on the basis of the previous cleaning history stored in the memory.

According to various embodiments, the at least one processor may learn the user preferred cleaning method for each of the plurality of areas on the basis of the artificial neural network model. The artificial neural network model may be trained by a supervised learning which uses, as an input of the artificial neural network model, a cleaning date, whether the cleaning immediately before a corresponding cleaning has been completed, the degree of contamination, and an area number, which are obtained from the previous cleaning history stored in the memory and uses, as a result value of the artificial neural network model, the performed cleaning method included in the cleaning history.

According to various embodiments, the at least one processor may determine the degree of contamination for each of the plurality of areas on the basis of the cleaning method of the previous cleaning history and whether the cleaning has been completed, which are stored in the memory.

According to various embodiments, the cleaning robot may further include a communication unit (e.g., the communication unit 110 of FIG. 3) communicating with external electronic devices. The at least one processor may obtain information on the degree of contamination for each of the plurality of areas from the external electronic device and may determine the degree of contamination for each of the plurality of areas on the basis of the cleaning method of the previous cleaning history and whether the cleaning has been completed, which are stored in the memory, and contamination information obtained from the external electronic device.

According to various embodiments, the at least one processor may estimate time available for cleaning based on the state of resources required for cleaning and determine the cleaning priority based on the degree of contamination for each of the plurality of areas and the time available for cleaning.

According to various embodiments, the at least one processor may determine the cleaning priority on the basis of the trained artificial neural network model. The trained artificial neural network model may receive the degree of contamination for each of the plurality of areas and the time available for cleaning and receive the cleaning method performed immediately before, whether the cleaning has been completed, and the type of the cleaning, which are stored in the memory, and may output the cleaning priority. In order to train the artificial neural network model according to the supervised learning, the degree of contamination for each of the plurality of areas for each cleaning, the time available for cleaning, the cleaning method performed immediately before, whether the cleaning has been completed, the type of the cleaning, and the cleaning priority may be obtained from the previous cleaning history stored in the memory and may be used as the learning data for the artificial neural network model.

According to various embodiments, the at least one processor may determine the cleaning method for each of the plurality of areas on the basis of the user preferred cleaning method for each of the plurality of areas, the degree of contamination for each of the plurality of areas, and the time available for cleaning.

According to various embodiments, the at least one processor may determine the cleaning method for each of the plurality of areas on the basis of the trained artificial neural network model. The trained artificial neural network model may receive the user preferred cleaning method for each of the plurality of areas, the degree of contamination for each of the plurality of areas, the time available for cleaning, the cleaning time for each cleaning method, and the type of the cleaning, and may output the cleaning method for each of the plurality of areas. In order to train the artificial neural network model according to the supervised learning, the user preferred cleaning method for each of the plurality of areas, the degree of contamination for each of the plurality of areas, the time available for cleaning, the cleaning time for each cleaning method, the type of the cleaning, and the cleaning method may be obtained from the previous cleaning history stored in the memory and may be used as the learning data for the artificial neural network model.

Figure 10:
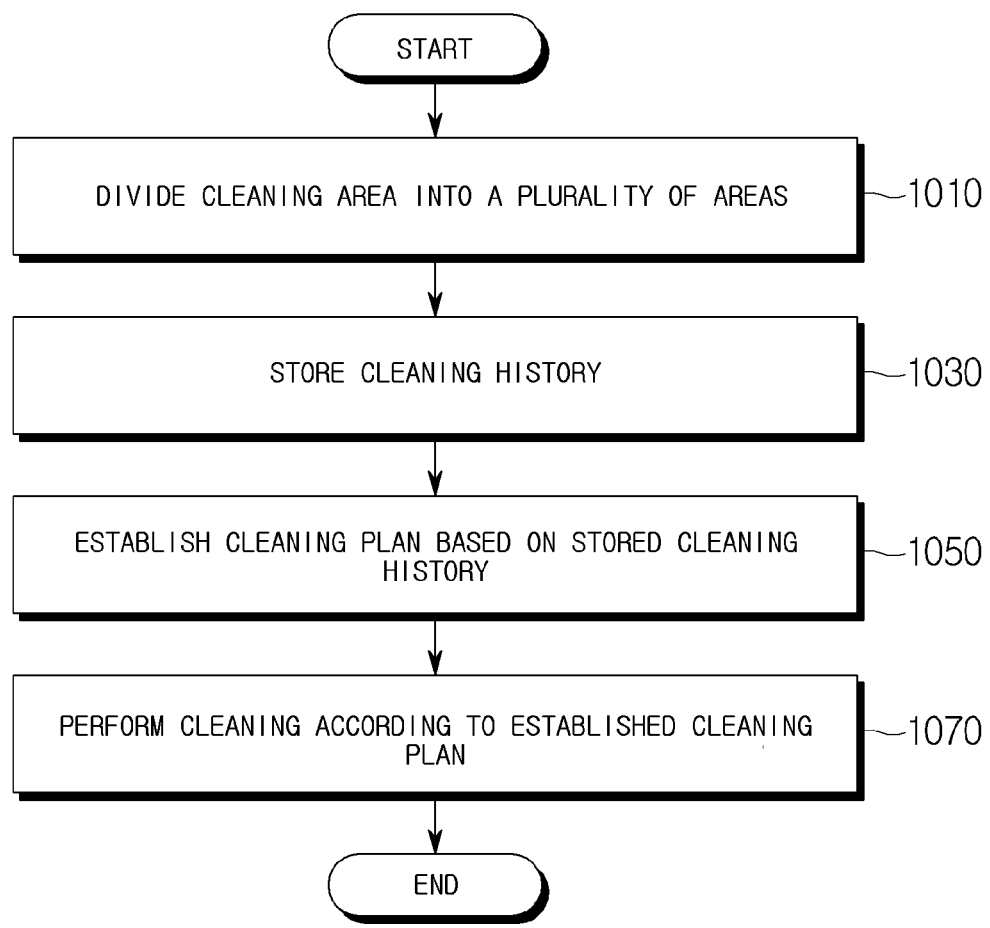
FIG. 10 is a flowchart showing an operation in which the cleaning robot establishes a cleaning plan on the basis of the previous cleaning history and performs the cleaning in accordance with various embodiments.

FIG. 10 is a flowchart showing an operation in which the cleaning robot 100 establishes a cleaning plan on the basis of the previous cleaning history and performs the cleaning in accordance with various embodiments. The operations according to the flowchart shown in FIG. 10 can be performed by an electronic device (e.g., the cleaning robot 100 of FIG. 3) or at least one processor (e.g., the processor 190 or the learning processor 130 of FIG. 3) of the electronic device.

Referring to FIG. 10, in step 1010, the cleaning robot 100 may obtain information on a cleaning area and divide the cleaning area into a plurality of areas on the basis of the obstacle information or information on protruding portions obtained through the 3D sensor or a contact sensor. According to the embodiment, the cleaning robot 100 may divide the cleaning area on the basis of immovable obstacles such as a wall. The cleaning robot 100 may generate and store a map showing the cleaning area and area information as shown in FIG. 6.

When the cleaning robot 100 detects an obstacle located at a different position from that of the information included in the current map or recognizes that the obstacle has disappeared at the start of the cleaning or during the cleaning, the cleaning robot 100 may update the map. According to the embodiment, the cleaning robot 100 may verify whether the currently stored map matches actual things by scanning through a 3D sensor at the start of every cleaning, and may update the map if there is a difference.

According to various embodiments, after performing the cleaning the cleaning robot 100 may store the history of the performed cleaning. According to the embodiment, the cleaning robot 100 may store a cleaning history after performing cleaning according to step 1070. For example, the cleaning robot 100 may store information on a cleaning method (e.g., zigzag cleaning, meticulous cleaning, intensive cleaning) used for each cleaning area, a cleaning time, and a moving path of the cleaning robot 100. Also, the cleaning robot 100 may include information on a start area (e.g., "A" in FIG. 6), an end area (e.g., "G" in FIG. 6), and a moving path between areas (e.g., in FIG. 6, A→B→D→E→F→I→H→G). In addition, the cleaning robot 100 may tag whether or not the cleaning has been completed for each area, and may also store information on whether the cleaning robot 100 has ended the cleaning earlier without completing the cleaning for all areas or whether the cleaning has been forcibly ended by the user.

According to various embodiments, in step 1050, the cleaning robot 100 may establish a cleaning plan based on the stored cleaning history. According to the embodiment, the cleaning robot 100 may establish a cleaning plan including a cleaning priority for each area and a cleaning method for each area.

The cleaning robot 100 may analyze the previous tasks included in the cleaning history stored in step 1030. The cleaning robot 100 may analyze information on the cleaning method for each area, the moving path, whether the cleaning has been completed, the earlier end of the cleaning, the forcible end of the cleaning, etc., through the analysis of the previous tasks. Based on this analysis, the cleaning robot 100 may recognize the cleaning state for each area. In addition, the cleaning robot 100 may learn an optimal moving path by analyzing the moving path and cleaning time. Also, the cleaning robot 100 may learn the user preferred cleaning method for each area through the analysis of the cleaning method for each area. According to the embodiment, the cleaning robot 100 may learn the preferred cleaning method by using the maximum frequency analysis or the trained artificial neural network model.

In addition, the cleaning robot 100 may determine the degree of indoor contamination for each area and may reflect the degree of indoor contamination in the establishment of the cleaning plan. According to the embodiment, the cleaning robot 100 may determine the degree of contamination of the area by using the stored previous cleaning history as well as information indicating the degree of contamination of each area from external electronic devices such as an air cleaner which detects the degree of contamination of the area or a PC which executes software which detects the degree of contamination from images captured by a camera.

The cleaning robot 100 may establish a cleaning plan based on the degree of contamination for each area, the previous cleaning history, and the user preferred cleaning method for each area. According to the embodiment, the cleaning robot 100 may determine a cleaning priority based on the degree of contamination for each area. Also, on the basis of the previous cleaning history and the degree of contamination for each area, the cleaning robot 100 may set an optimum cleaning method for each area that can minimize the degree of contamination for each area after cleaning. Also, on the basis of the state of resources required for cleaning, for example, a battery charge state, a water level, and detergent state, the cleaning robot 100 may estimate a time period during which the resources can be exhausted and may adjust the cleaning priority and cleaning method on the basis of the time period. According to the embodiment, the cleaning robot 100 may determine the cleaning priority and the cleaning method for each area by using the trained artificial neural network model.

According to various embodiments, the cleaning robot 100 may perform cleaning according to the established cleaning plan. According to the embodiment, the cleaning robot 100 may perform the cleaning according to the cleaning priority for each area and the cleaning method for each area established in step 1050. After the cleaning is completed, in accordance with step 1030, the cleaning robot 100 may store the cleaning history.

Figure 11:
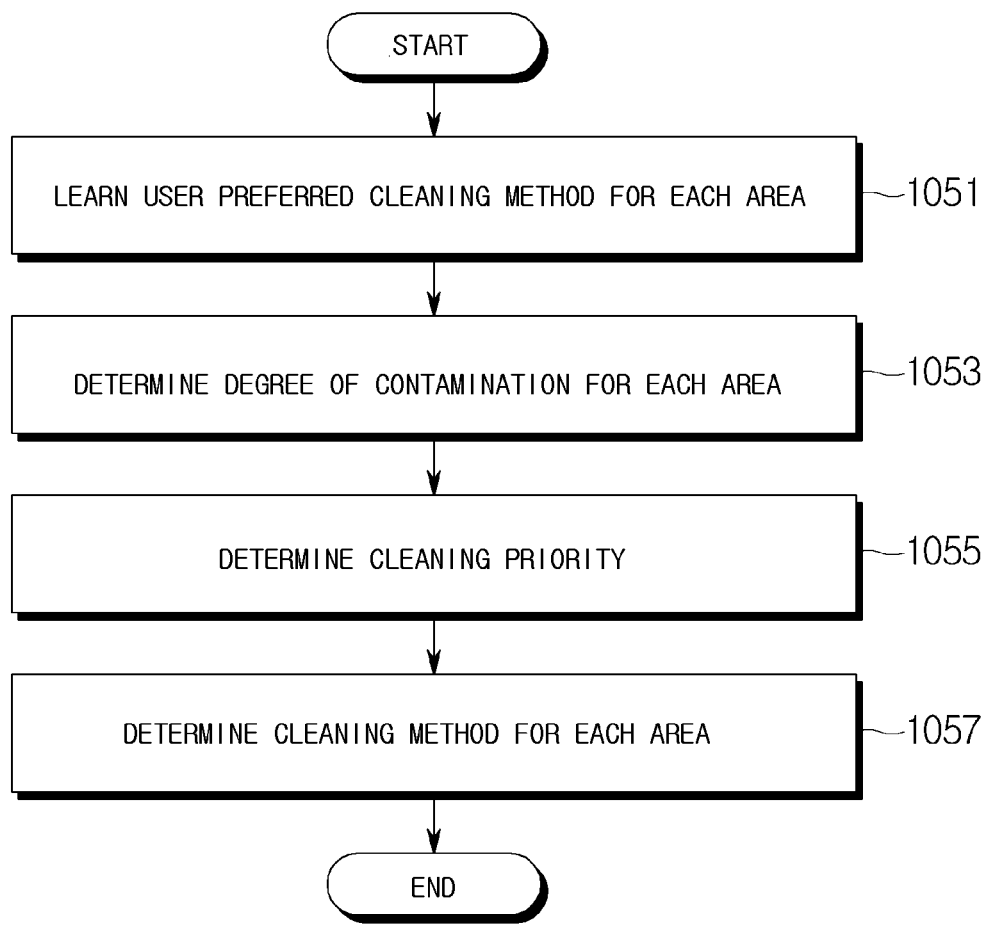
FIG. 11 is a flowchart showing an operation that the cleaning robot performs in order to establish the cleaning plan in accordance with various embodiments.

FIG. 11 is a flowchart showing an operation that the cleaning robot 100 performs in order to establish the cleaning plan in accordance with various embodiments. The operations according to the flowchart shown in FIG. 11 can be performed by an electronic device (e.g., the cleaning robot 100 of FIG. 3) or at least one processor (e.g., the processor 190 or the learning processor 130 of FIG. 3) of the electronic device.

Referring to FIG. 11, in step 1051, the cleaning robot 100 may learn a user preferred cleaning method for each area. The cleaning robot 100 may learn the user preferred cleaning method for each area on the basis of the stored previous cleaning history. According to the embodiment, the cleaning robot 100 receives a cleaning date or cleaning day, whether the previous cleaning has been completed, a degree of contamination, and an area number and trains the neural network model by using the learning data which provides the cleaning method as a result value, so that it is possible for the planning module 930 to learn the user preferred cleaning method for each area.

According to various embodiments, in step 1053, the cleaning robot 100 may determine the degree of contamination for each area. According to the embodiment, the cleaning robot 100 may obtain information indicating the degree of contamination of each area from external electronic devices which detect the degree of contamination of the area and may determine the degree of contamination of the area by using not only the stored previous cleaning history but the obtained degree of contamination. For example, the degree of contamination of a specific area in which the cleaning is not proceeded in the previous cleaning due to the earlier end of the cleaning and the forcible end of the cleaning may be set to be higher by the cleaning robot 100. Also, when intensive cleaning is performed in the previous cleaning, the degree of contamination of the corresponding area may be set to be lower.

According to various embodiments, in step 1055, the cleaning robot 100 may determine the cleaning priority. According to the embodiment, the cleaning robot 100 may determine the cleaning priority on the basis of the degree of contamination for each area determined in step 1053. According to another embodiment, on the basis of the state of resources required for cleaning, for example, a battery charge state, a water level, and detergent state, the cleaning robot 100 may estimate a time period during which the resources can be exhausted and may adjust the cleaning priority on the basis of the time period. For example, in the case of an area requiring wet mop cleaning, the cleaning robot 100 may give a higher priority to an area with a low degree of contamination and may give a lower priority to an area with a high degree of contamination. When the time available for cleaning is short, the cleaning robot 100 may give a high priority to an area with a high degree of contamination and may give a low priority to an area with a low degree of contamination. According to the embodiment, the cleaning robot 100 may determine the cleaning priority for each area by using the trained artificial neural network model.

According to various embodiments, in step 1057, the cleaning robot 100 may determine the cleaning method for each area. According to the embodiment, on the basis of the previous cleaning history and the degree of contamination for each area, the cleaning robot 100 may set an optimum cleaning method for each area that can minimize the degree of contamination for each area after cleaning. Also, on the basis of the state of resources required for cleaning, for example, a battery charge state, a water level, and detergent state, the cleaning robot 100 may estimate a time period during which the resources can be exhausted and may adjust the cleaning method on the basis of the time period. For example, the cleaning robot 100 may use an intensive cleaning method with a high possibility of decontamination for the area with a high degree of contamination, and may use a zigzag cleaning method for the area with a low degree of contamination. Also, when a total available time for cleaning is short, the cleaning robot 100 may use a zigzag cleaning method having a shorter cleaning time rather than use a meticulous cleaning method having a longer cleaning time.

Referring to the above description, the present disclosure proposes the cleaning robot that stores the previous tasks and establishes the cleaning plan by referring to the previous tasks. Due to this, the present disclosure proposes that the cleaning robot finds and performs the user preferred cleaning method for each area and establishes a more efficient cleaning plan in terms of time and in terms of the removal of the degree of contamination, thereby enabling efficient cleaning.

According to various embodiments, a method of operating a cleaning robot (for example, the cleaning robot 100 of FIG. 3) may include dividing a cleaning area into a plurality of areas, storing a history of a previous cleaning performed by the cleaning robot in a memory, establishing a cleaning plan based on the previous cleaning history stored in the memory, and controlling the cleaning to be performed according to the established cleaning plan.

According to various embodiments, the establishing of the cleaning plan based on the previous cleaning history stored in the memory may include learning the user preferred cleaning method for each of the plurality of areas on the basis of the previous cleaning history, determining the degree of contamination for each of the plurality of areas on the basis of at least a portion of the previous cleaning history, determining the cleaning priority on the basis of the degree of contamination for each of the plurality of areas, and determining the cleaning method for each of the plurality of areas on the basis of the user preferred cleaning method for each of the plurality of areas and the degree of contamination for each of the plurality of areas.

According to various embodiments, the learning of the user preferred cleaning method for each of the plurality of areas on the basis of the previous cleaning history may include learning the user preferred cleaning method for each of the plurality of areas through the maximum frequency analysis that selects the most used cleaning method on the basis of the previous cleaning history stored in the memory.

According to various embodiments, the learning of the user preferred cleaning method for each of the plurality of areas on the basis of the previous cleaning history may include learning the user preferred cleaning method for each of the plurality of areas on the basis of the artificial neural network model. The artificial neural network model may be trained by a supervised learning which uses, as an input of the artificial neural network model, a cleaning date, whether the cleaning immediately before a corresponding cleaning has been completed, the degree of contamination, and an area number, which are obtained from the previous cleaning history stored in the memory and uses, as a result value of the artificial neural network model, the performed cleaning method included in the cleaning history.

According to various embodiments, the determining of the degree of contamination for each of the plurality of areas on the basis of at least a portion of the previous cleaning history may include determining the degree of contamination for each of the plurality of areas on the basis of the cleaning method of the previous cleaning history and whether the cleaning has been completed, which are stored in the memory.

According to various embodiments, the determining of the degree of contamination for each of the plurality of areas on the basis of at least a portion of the previous cleaning history may include obtaining information on the degree of contamination for each of the plurality of areas from the external electronic device, and determining the degree of contamination for each of the plurality of areas on the basis of the cleaning method of the previous cleaning history and whether the cleaning has been completed, which are stored in the memory, and contamination information obtained from the external electronic device.

According to various embodiments, the determining of the cleaning priority on the basis of the degree of contamination for each of the plurality of areas may include estimating time available for cleaning based on the state of resources required for cleaning, and determining the cleaning priority based on the degree of contamination for each of the plurality of areas and the time available for cleaning.

According to various embodiments, the determining of the cleaning priority on the basis of the degree of contamination for each of the plurality of areas may include determining the cleaning priority on the basis of the trained artificial neural network model. The trained artificial neural network model may receive the degree of contamination for each of the plurality of areas and the time available for cleaning and receive the cleaning method performed immediately before, whether the cleaning has been completed, and the type of the cleaning which are stored in the memory, and may output the cleaning priority. In order to train the artificial neural network model according to the supervised learning, the degree of contamination for each of the plurality of areas for each cleaning, the time available for cleaning, the cleaning method performed immediately before, whether the cleaning has been completed, the type of the cleaning, and the cleaning priority may be obtained from the previous cleaning history stored in the memory and may be used as the learning data for the artificial neural network model.

According to various embodiments, the determining of the cleaning method for each of the plurality of areas may include determining the cleaning method for each of the plurality of areas on the basis of the user preferred cleaning method for each of the plurality of areas, the degree of contamination for each of the plurality of areas, and the time available for cleaning.

According to various embodiments, the determining of the cleaning method for each of the plurality of areas may include determining the cleaning method for each of the plurality of areas on the basis of the trained artificial neural network model. The trained artificial neural network model may receive the user preferred cleaning method for each of the plurality of areas, the degree of contamination for each of the plurality of areas, the time available for cleaning, the cleaning time for each cleaning method, and the type of the cleaning, and may output the cleaning method for each of the plurality of areas. In order to train the artificial neural network model according to the supervised learning, the user preferred cleaning method for each of the plurality of areas, the degree of contamination for each of the plurality of areas, the time available for cleaning, the cleaning time for each cleaning method, the type of the cleaning, and the cleaning method may be obtained from the previous cleaning history stored in the memory and may be used as the learning data for the artificial neural network model.

What is claimed is:

1. A robot comprising:
   an input unit configured to obtain commands and setting information;
   a memory configured to store a previous cleaning history of the robot; and
   at least one processor configured to
   divide an area into a plurality of areas,
   establish a plan including at least a cleaning priority for each of the plurality of areas based at least in part on the stored previous cleaning history; and
   control a cleaning to be performed according to the established plan,
   wherein the at least one processor is further configured to analyze a user preferred cleaning method for each of the plurality of areas based on the stored previous cleaning history, and establish the plan based on the user preferred cleaning method, and
   wherein the user preferred cleaning method for each of the plurality of areas is analyzed through a frequency analysis that selects a particular cleaning method with a highest usage frequency based on the stored previous cleaning history.

2. The robot of claim 1, wherein the plan is established further by:
   determining a degree of contamination for each of the plurality of areas based at least in part on a portion of the stored previous cleaning history,
   determining a cleaning priority based at least in part on the determined degree of contamination for each of the plurality of areas, and determining a cleaning method for each of the plurality of areas based at least in part on the stored previous cleaning history for each of the plurality of areas.

3. The robot of claim 2, wherein the user preferred cleaning method for each of the plurality of areas is analyzed based on an artificial neural network model, wherein the artificial neural network model is trained by supervised learning which uses, as an input to the artificial neural network model, at least: a cleaning date, whether a previous cleaning has been completed, the determined degree of contamination, or an area number and uses the user preferred cleaning method comprised in the stored previous cleaning history as a result value of the artificial neural network model.

4. The robot of claim 2, wherein the degree of contamination for each of the plurality of areas is determined based on the determined cleaning method for each of the plurality of areas of the stored previous cleaning history and whether the cleaning has been completed.

5. The robot of claim 2 further comprising a communication unit configured to communicate with an external device, wherein the at least one processor is further configured to:
   obtain information on the degree of contamination for each of the plurality of areas from the external device, and
   determine the degree of contamination for each of the plurality of areas based at least in part on the determined cleaning method of the stored previous cleaning history, whether the cleaning has been completed, or contamination information obtained from the external device.

6. The robot of claim 2, wherein the at least one processor is further configured to estimate a time available for cleaning based on a state of resources for cleaning, and wherein the cleaning priority is determined based at least in part on the determined degree of contamination for each of the plurality of areas or the estimated time available for cleaning.

7. The robot of claim 6, wherein the cleaning priority is determined based on a trained artificial neural network model,
   wherein the trained artificial neural network model is configured to receive at least: the determined degree of contamination for each of the plurality of areas, the estimated time available for cleaning, a cleaning method performed immediately before, whether a cleaning has been completed, or a type of the cleaning and to output the cleaning priority,
   and wherein the trained artificial neural network model is trained according to supervised learning by using training data obtained from the stored previous cleaning history, wherein the training data comprises at least one of: the determined degree of contamination for each of the plurality of areas for each cleaning, the estimated time available for cleaning, the cleaning method performed immediately before, whether the cleaning has been completed, the type of the cleaning, or the cleaning priority.

8. The robot of claim 6, wherein the cleaning method for each of the plurality of areas is determined based at least in part on: the user preferred cleaning method for each of the plurality of areas, the determined degree of contamination for each of the plurality of areas, or the estimated time available for the cleaning.

9. The robot of claim 8, wherein the at least one processor is further configured to determine the cleaning method for each of the plurality of areas based on a trained artificial neural network model,
   wherein the trained artificial neural network model is configured to receive at least: the user preferred cleaning method for each of the plurality of areas, the determined degree of contamination for each of the plurality of areas, the estimated time available for cleaning, cleaning time for each cleaning method, or a type of the cleaning, and to output the cleaning method for each of the plurality of areas,
   and wherein the trained artificial neural network model is trained according to supervised learning by using training data obtained from the stored previous cleaning history, wherein the training data comprises at least: user preferred cleaning method for each of the plurality of areas, the determined degree of contamination for each of the plurality of areas, the estimated time available for cleaning, the cleaning time for each cleaning method, the type of the cleaning, or the cleaning method.

10. A method of operating a robot, the method comprising:
   dividing an area into a plurality of areas;
   storing a previous cleaning history performed by the robot in a memory;
   establishing a plan including at least a cleaning priority for each of the plurality of areas based at least in part on the stored previous cleaning history; and
   controlling a cleaning to be performed according to the established plan,
   wherein establishing the plan comprises analyzing a user preferred cleaning method for each of the plurality of areas based on the stored previous cleaning history, and establishing the plan based on the user preferred cleaning method, and
   wherein the user preferred cleaning method for each of the plurality of areas is analyzed through a frequency analysis that selects a particular cleaning method with a highest usage frequency based on the stored previous cleaning history.

11. The method of claim 10, wherein the plan is established further by:
   determining a degree of contamination for each of the plurality of areas based at least in part on a portion of the stored previous cleaning history,
   determining a cleaning priority based at least in part on the determined degree of contamination for each of the plurality of areas, and
   determining a cleaning method for each of the plurality of areas based at least in part on the stored previous cleaning history for each of the plurality of areas.

12. The method of claim 11,
   wherein the user preferred cleaning method for each of the plurality of areas is analyzed based on an artificial neural network model, wherein the artificial neural network model is trained by supervised learning which uses, as an input to the artificial neural network model, at least: a cleaning date, whether a previous cleaning has been completed, the determined degree of contamination, or an area number and uses the preferred cleaning method comprised in the stored previous cleaning history as a result value of the artificial neural network model.

13. The method of claim 11, wherein the degree of contamination for each of the plurality of areas is determined based on the determined cleaning method of the stored previous cleaning history and whether the cleaning has been completed.

14. The method of claim 11, further comprising:
   obtaining information on the degree of contamination for each of the plurality of areas from an external device; and
   determining the degree of contamination for each of the plurality of areas based at least in part on the determined cleaning method of the stored previous cleaning history, whether the cleaning has been completed, or contamination information obtained from the external device.

15. The method of claim 11, further comprising estimating a time available for cleaning based on a state of resources for cleaning, and wherein the cleaning priority is determined based at least in part on the determined degree of contamination for each of the plurality of areas or the estimated time available for cleaning.

16. The method of claim 15, wherein the cleaning priority is determined based on a trained artificial neural network model,
   wherein the trained artificial neural network model receives at least: the determined degree of contamination for each of the plurality of areas, the estimated time available for cleaning, the cleaning method performed immediately before, whether the cleaning has been completed, or a type of the cleaning,
   and wherein trained the artificial neural network model is trained according to supervised learning by using training data obtained from the stored previous cleaning history, wherein the training data comprises at least one of: the determined degree of contamination for each of the plurality of areas for each cleaning, the estimated time available for cleaning, the cleaning method performed immediately before, whether the cleaning has been completed, the type of the cleaning, or the cleaning priority.

17. The method of claim 15, wherein the cleaning method for each of the plurality of areas is determined based at least in part on: the user preferred cleaning method for each of the plurality of areas, the determined degree of contamination for each of the plurality of areas, or the estimated time available for cleaning.

18. The method of claim 17, wherein the cleaning method for each of the plurality of areas is determined based on a trained artificial neural network model,
   wherein the trained artificial neural network model receives at least: the user preferred cleaning method for each of the plurality of areas, the determined degree of contamination for each of the plurality of areas, the estimated time available for cleaning, cleaning time for each cleaning method, or a type of the cleaning, and outputs the cleaning method for each of the plurality of areas,
   and wherein the trained artificial neural network model is trained according to supervised learning by using training data obtained from the stored previous cleaning history, wherein the training data comprises at least: the user preferred cleaning method for each of the plurality of areas, the determined degree of contamination for each of the plurality of areas, the estimated time available for cleaning, the cleaning time for each cleaning method, the type of the cleaning, or a cleaning method.

* * * * *